United States Patent
Yamamoto

[11] Patent Number: 5,949,527
[45] Date of Patent: Sep. 7, 1999

[54] FILM MAGAZINE

[75] Inventor: Yuji Yamamoto, Wakayama, Japan

[73] Assignee: Noritsu Koki Co., Ltd., Wakayama-ken, Japan

[21] Appl. No.: 08/797,863

[22] Filed: Feb. 10, 1997

[30] Foreign Application Priority Data

Feb. 9, 1996 [JP] Japan ................................. 8-023925

[51] Int. Cl.$^6$ ............................. G03B 27/62; G03B 27/52
[52] U.S. Cl. .............................................. 355/75; 355/40
[58] Field of Search ............................... 355/75, 76, 72, 355/40; 242/348, 348.1, 348.2, 348.3, 348.4, 548; 396/647, 648, 634, 636, 446; 369/111; 360/242, 324; 353/68

[56] References Cited

U.S. PATENT DOCUMENTS

| | | | |
|---|---|---|---|
| 3,727,535 | 4/1973 | Streeter | 95/93 |
| 3,937,325 | 2/1976 | Dodge et al. | 206/387 |
| 4,461,554 | 7/1984 | Norris et al. | 354/275 |
| 4,772,952 | 9/1988 | Liem | 358/214 |
| 4,928,897 | 5/1990 | Satou et al. | 242/55 |
| 5,275,347 | 1/1994 | Keeney | 242/71 |
| 5,298,929 | 3/1994 | Tsunefuji et al. | 354/159 |
| 5,544,833 | 8/1996 | Zander | 242/348 |
| 5,546,160 | 8/1996 | Kishi et al. | 355/50 |
| 5,748,290 | 5/1998 | Nakao | 355/75 |

FOREIGN PATENT DOCUMENTS

| | | | |
|---|---|---|---|
| 0679947 | 11/1995 | European Pat. Off. | G03D 13/00 |
| 7064199 | 3/1995 | Japan . | |

OTHER PUBLICATIONS

EPO–Patent Abstracts of Japan; Publ No. 07064199; Publ Date: Mar. 10, 1995; Appn No. 06060568; Appln Date: Mar. 30, 1994; Applicant: Noritsu Koki Co Ltd; Inventors: K Takuji, M Motoaki, O Kimiharu; Intl Class: G03B 27/46; Method and Device for Continuously Supplying Film.

EPO–Patent Abstracts of Japan; Publ No. 62070169; Publ Date: Mar. 31, 1987; Appn No. 60207180; Appln Date: Sep. 19, 1985; Applicant: Fuji Photo Film Co Ltd; Inventor: K Mikio; Intl Class: B65H 45/101; Photographic Paper Handling Device.

*Primary Examiner*—Safet Metjahic
*Assistant Examiner*—Hung Henry Nguyen
*Attorney, Agent, or Firm*—Fulbright & Jaworski, LLP

[57] ABSTRACT

A film magazine for storing a plurality of films therein is disclosed. The magazine includes a drum capable of storing the plurality of films, and a plurality of retaining mechanisms for retaining respective ends of the films relative to the drum. The drum defines a plurality of slits for allowing individual insertion of the ends of the films into the drum.

18 Claims, 11 Drawing Sheets

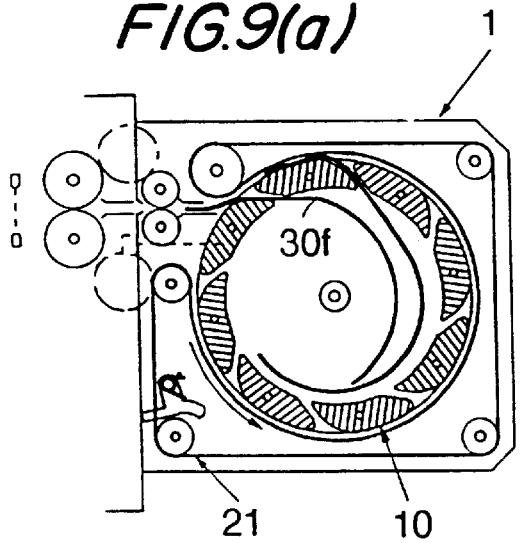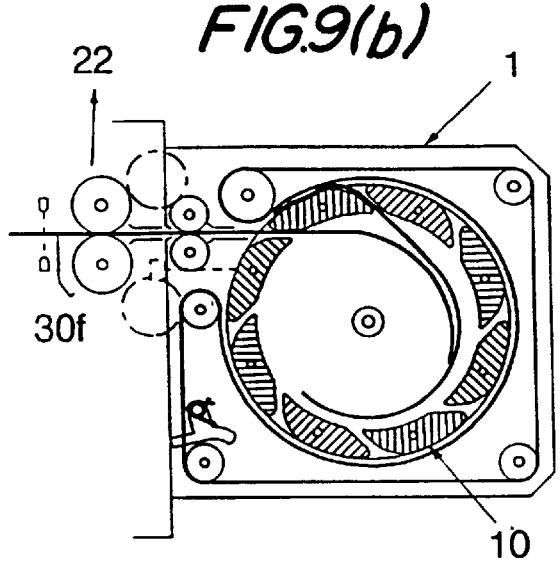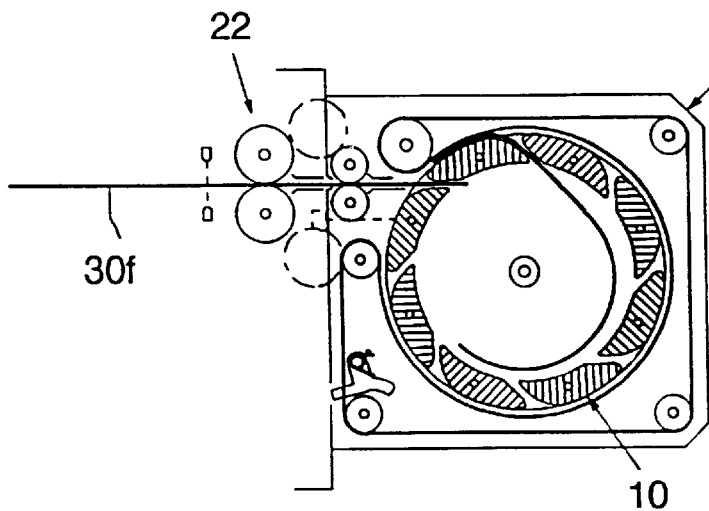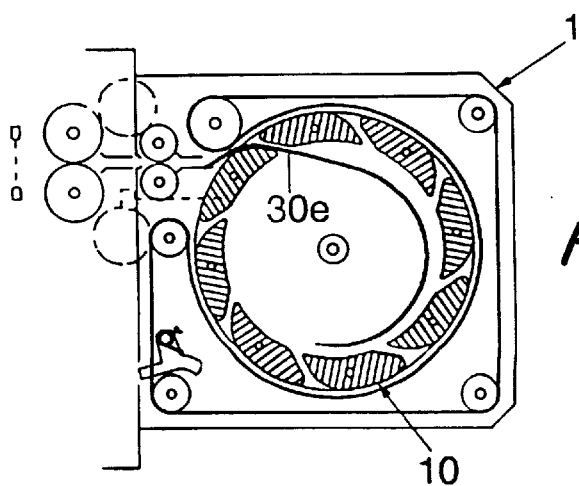

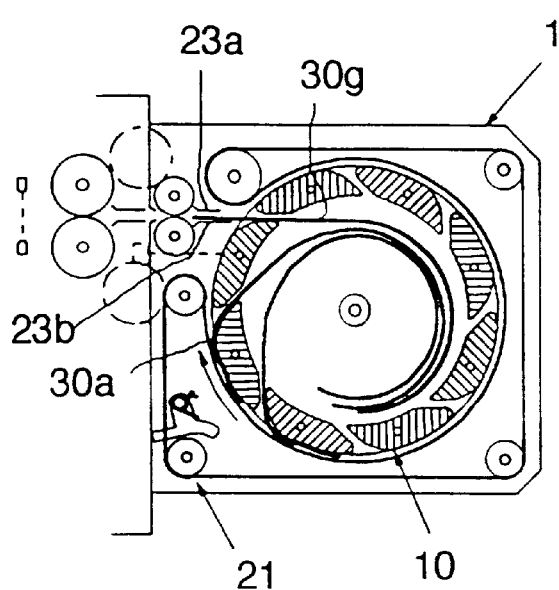
FIG.10(a)
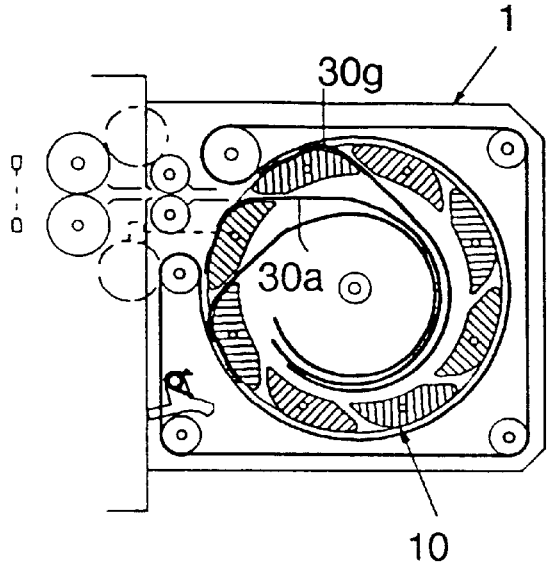
FIG.(b)
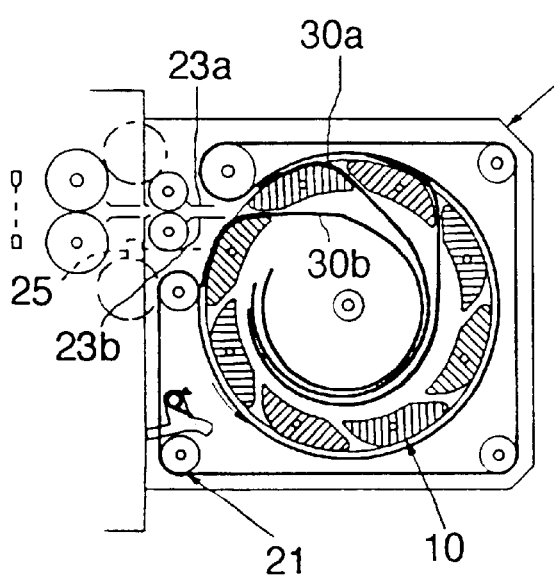
FIG.10(c)
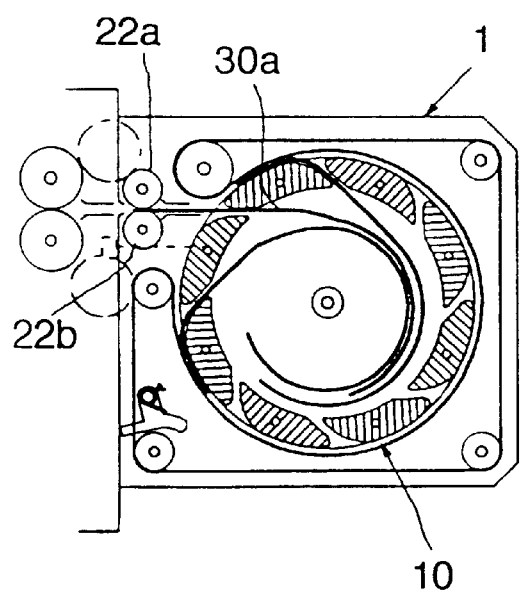
FIG.10(d)

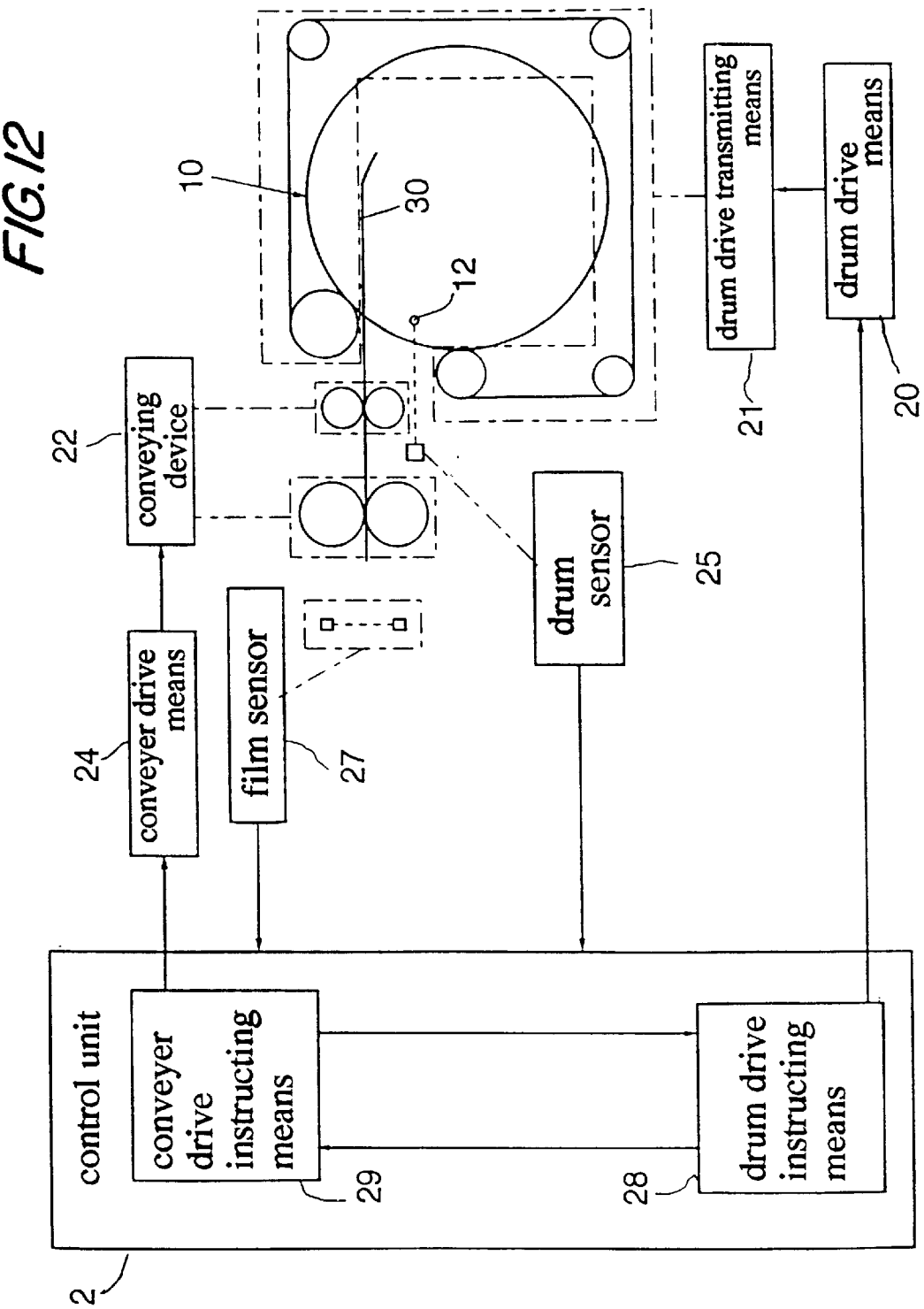

FILM MAGAZINE

BACKGROUND OF THE INVENTION

1. Field of the Invention

The present invention relates to a film magazine for storing therein a plurality of films to be fed to a photographic printing apparatus, and relates, more particularly, to a film magazine for storing therein a plurality of film pieces to be reprinted according to a consumer's order.

2. Description of the Related Art

The conventional film magazines for feeding a film to a film insertion opening of a photographic printing apparatus are generally of two types, i.e. one adapted for storing only a single film piece and the other adapted for storing a plurality of film pieces which are spliced with each other via adhesive tapes. Here, it is understood that the 'film piece' refers to one of a plurality of short film pieces cut from a long developed film strip in such a manner that each film piece has a predetermined length corresponding to 4 or 6 image-bearing frames. The Japanese laid-open patent gazette Hei. 7-64199 discloses a film magazine having an alternative construction permitting storage of a plurality of films without splicing them. Specifically, with this film magazine, a plurality of film pieces are wound one after another about a drum with a leading end of a film being placed over a trailing end of a preceding film. And, rollers are provided for pressing the outer peripheries of the wound films toward the common axis of winding thereof so as to maintain the overlapping end portions of the films under loaded contact with each other.

In the case of the film magazine of the first-mentioned type, i.e. the magazine adapted for storing a single film piece alone, for printing a plurality of film pieces by the printing apparatus, the magazine needs to be mounted and dismounted frequently. Hence, this type of magazine has room for improvement in terms of operational convenience. Incidentally, in the following discussion, it is understood that the term 'film' refers to either such film piece as described above or the long un-cut film strip from which a plurality of film pieces are to be cut.

The film magazine of the second-mentioned type adapted for storing a plurality of films spliced with each other provides some improvement in the above respect by eliminating the necessity of such frequent mounting and dismounting operations. However, this type of magazine, of course, requires the different trouble of splicing the film pieces. In addition, if a subsequent operation requires a change in the winding order of the films, it is necessary to once separate the spliced films from each other and then to splice them again according to the required different order.

The film magazine of the third-mentioned type is designed to eliminate the above troubles relating to the splicing of films, by means of the construction described above. Yet, this third type magazine has not solved the secondmentioned problem of the second type magazine. That is, just like the second type magazine, the third type magazine does not allow freedom in changing the winding order of the films for the purpose of changing the printing order thereof, for the construction does not allow random access to any desired one of the films stored therein, but allows only sequential access from the outermost wound film. Hence, this magazine still has room for improvement in this respect.

SUMMARY OF THE INVENTION

For solving the above-described drawbacks of the conventional constructions, according to one aspect of the present invention, a film magazine for storing a plurality of films therein, which comprises: a drum capable of storing the plurality of films; and a plurality of retaining mechanisms for retaining respective ends of the films relative to the drum; the drum defining a plurality of slits for allowing individual insertion of the ends of the films into the drum.

With the above-described construction, without splicing the films with each other, a plurality of films may be stored within a single magazine, by individually inserting the films through the slits. Hence, the storing operations of the films into the magazine may be readily effected. And, as these storing operations are effected by individually inserting the films through the slits, the ends of the films need not be sliced with each other.

Preferably, the magazine allows withdrawal of any desired one of the films from the drum.

With this feature, in addition to the above-described advantage that the single magazine can accommodate a plurality of films without splicing them thereby to facilitate the charging or inserting operatons of the films into the magazine, there is achieved another advantage of allowing randomly selected withdrawal of a desired film from the magazine to be fed to the printing apparatus. Hence, the efficiency of the printing operations may be improved.

Still preferably, the retaining mechanisms are respectively disposed adjacent the slits.

The above feature further facilitates the inserting, i.e. storing operations of the films into the magazine.

According to one preferred embodiment of the present invention, the retaining mechanism comprises a plate spring having one end fixedly attached to the drum and the other free end movable between a retaining position and a releasing position.

With the above construction, the end of each film is retained between the free end of the plate spring and a portion of the drum adjacent the slit. Then, by operating the retaining mechanism into the retaining position, the end of the film is retained here relative to the drum. And, by operating the mechanism into the releasing position, the film end is released from the drum. As the retaining mechanism is constructed from such simple element as a plate spring, the cost of the entire magazine may be advantageously reduced.

Preferably, the film magazine further comprises a retention releasing mechanism for switching over the plate spring from the retaining position to the releasing position. Still preferably, the retention releasing mechanism comprises a retention releasing cam capable of operating the plate spring into the releasing position by elastically deforming the free end of the plate spring.

Still preferably, the free end of the plate spring is urged in a direction toward the retaining position.

With the above construction, the film end is normally maintained under the retained condition by the urging force of the plate spring. Thus, the film end may be retained reliably.

According to a further embodiment of the present invention, the plurality of retaining mechanisms comprises a belt disposed in contact with and about an outer periphery of the drum for retaining the ends of the films between the belt and the drum outer periphery.

With the above construction, the plurality of retaining mechanisms comprise a single belt contacting the outer periphery of the drum to retain the ends of the films relative to the drum. As a result, the ends of the plurality of films inserted into the individual slits may be retained at one time by the single belt. Hence, by eliminating the necessity of plurality of retaining mechanisms, this alternative construction provides the advantage of simplicity, which contributes to further cost reduction of the entire film magazine.

Preferably, the outer periphery of the drum includes a contact area contacting the belt and a non-contact area free from contact with the belt.

With the above, as the outer periphery of the drum includes a contact area contacting the belt and a non-contact area free from contact with the belt, the end of a film inserted into a slot located at the non-contact area is not retained. Then, by rotating the drum relative to the retaining mechanism, the film which was inserted into the slit located at the contact area can now be released from the retention. Thus, by providing the contact area and the non-contact area relative to the belt, the retention and release of the film may be effected relatively easily. Then, as this construction does not require any special releasing mechanism for releasing the retained condition of the film, the construction of the entire magazine may be further simplified and the costs of the magazine may be further reduced accordingly.

Preferably, the film magazine further comprises a drum-rotation restricting member for restricting rotation of the drum by coming into contact with the outer periphery of the drum.

Still preferably, the drum-rotation restricting member is rendered inoperative for not restricting the drum rotation when the film magazine is attached to the printing apparatus.

With the above, when the film magazine is not attached to the printing apparatus, the drum is prevented from being moved inadvertently. Whereas, when the magazine is attached to the printing apparatus, the restricting member does not restrict rotation of the drum for allowing insertion of the plurality of films one after another. Accordingly, the film magazine having this construction provides greater convenience in handling thereof.

Preferably, the film magazine further comprises conveying means for conveying the film to the drum and drive transmitting means for transmitting a drive force from the printing apparatus to the conveying means.

With the above-described construction, the drive force for the conveying means for conveying the film to the drum is available from the printing apparatus.

Hence, the film magazine does not require any drive mechanism of its own such as a motor. Hence, this construction will further contribute to simple and cost-effective construction of the entire magazine. Still preferably, the film magazine further comprises: detecting means for detecting an angular position of the drum; and drum driving means for driving the drum by a predetermined angle based on detection information of the detecting means.

With the above construction, by the detecting means, an angular displacement of the drum may be detected and the drum may be driven to rotate by the predetermined angle based on the detection. Accordingly, an end of a film retained adjacent a slit may be rotatably moved relative to an entrance of the printing apparatus.

Preferably, the predetermined angle corresponds to an angular pitch of the plurality of slits defined in the outer periphery of the drum.

With the above, the drum may be rotated step-wise by an amount corresponding to the angular pitch of the slits. Then, after withdrawing and conveying one film from one slit, the drum may be rotated to bring an end of a further film retained adjacent the next slit into registry with the entrance of the printing apparatus.

Further, in the case also of reversely feeding a film from the printing apparatus to the magazine, after one film is feed into one slit of the drum, the drum may be rotated to bring the next slit into registry with the entrance/exit of a winding device incorporated in the printing apparatus. Consequently, with the possibility of pitch-wise rotation of the drum, the above construction facilitates the transition from the step of feeding one film from the magazine to the printing apparatus to the subsequent step of feeding a next film thereto. The construction facilitates also the reverse transition from the step of returning a film from the printing apparatus to the magazine to the subsequent step of returning a next film thereto.

Further and other objects, features and effects of the invention will become more apparent from the following more detailed description of the embodiments of the invention with reference to the accompanying drawings.

BRIEF DESCRIPTION OF THE DRAWINGS

FIGS. 8 and 9 are views illustrating, in a step-by-step manner, a process of feeding films stored in the magazine to the winding device, FIG. 10 is a view illustrating, in a step-by-step manner, a process for discharging films stored in the magazine in the same order as the order of having wound these films within the winding device, FIG. 12 is a block diagram showing a control device for controlling drives of a drum and of a conveyer device.

DETAILED DESCRIPTION OF THE PREFERRED EMBODIMENTS

Next, preferred embodiments of the present invention will now be described in details with reference to the accompanying drawings.

Figure 1:
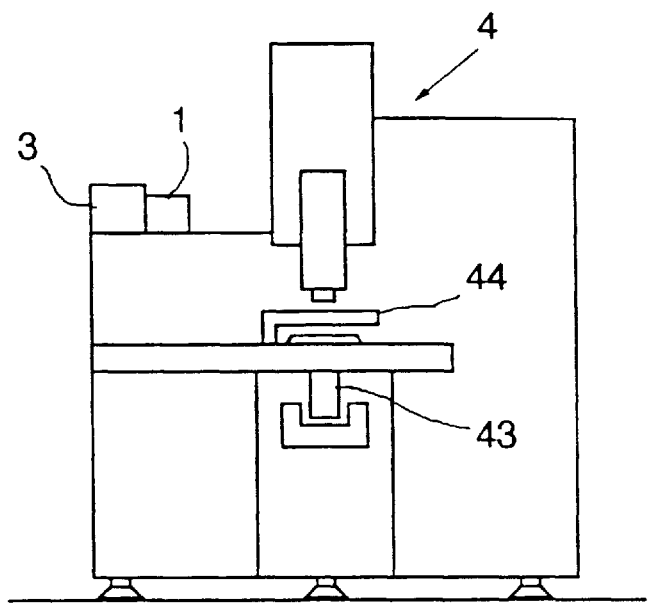
FIG. 1 is an overall view of a photographic printing apparatus to which a film magazine relating to the present invention is to be attached.
Figure 2:
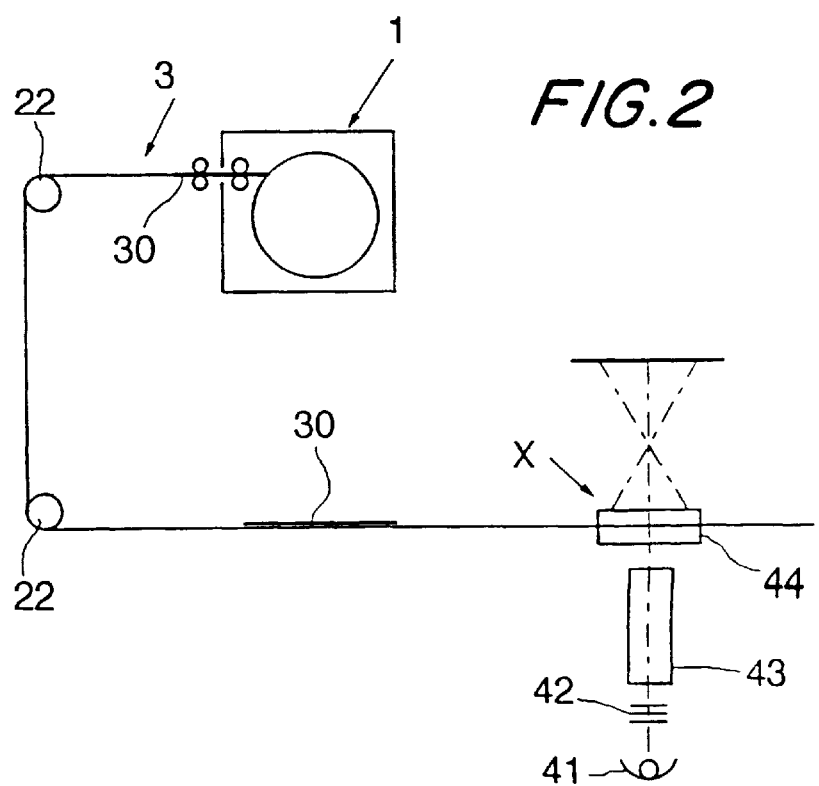
FIG. 2 is a schematic illustrating a flow of a film for effecting a photographic printing operation by the printing apparatus.

FIG. 1 shows an outer appearance of a photographic film printing apparatus 4. Numeral 1 denotes a film magazine to be detailed later, and numeral 3 denotes a winding device for taking up a film 30 from in the film magazine 1 or reversely discharging the film 30 located in the printing apparatus 4 to the film magazine 1. The film 30 wound by the winding device 3 is conveyed to a printing exposure stage X by means of a conveyer device including a plurality of rollers 22, where the film is exposed and printed. Numeral 41 denotes a light source, numeral 42 denotes a light modulating filter, numeral 43 denotes a mirror tunnel, and a numeral 44 denotes a negative mask. As these components are not directly related to the present invention, they will not be detailed herein.

Figure 3:
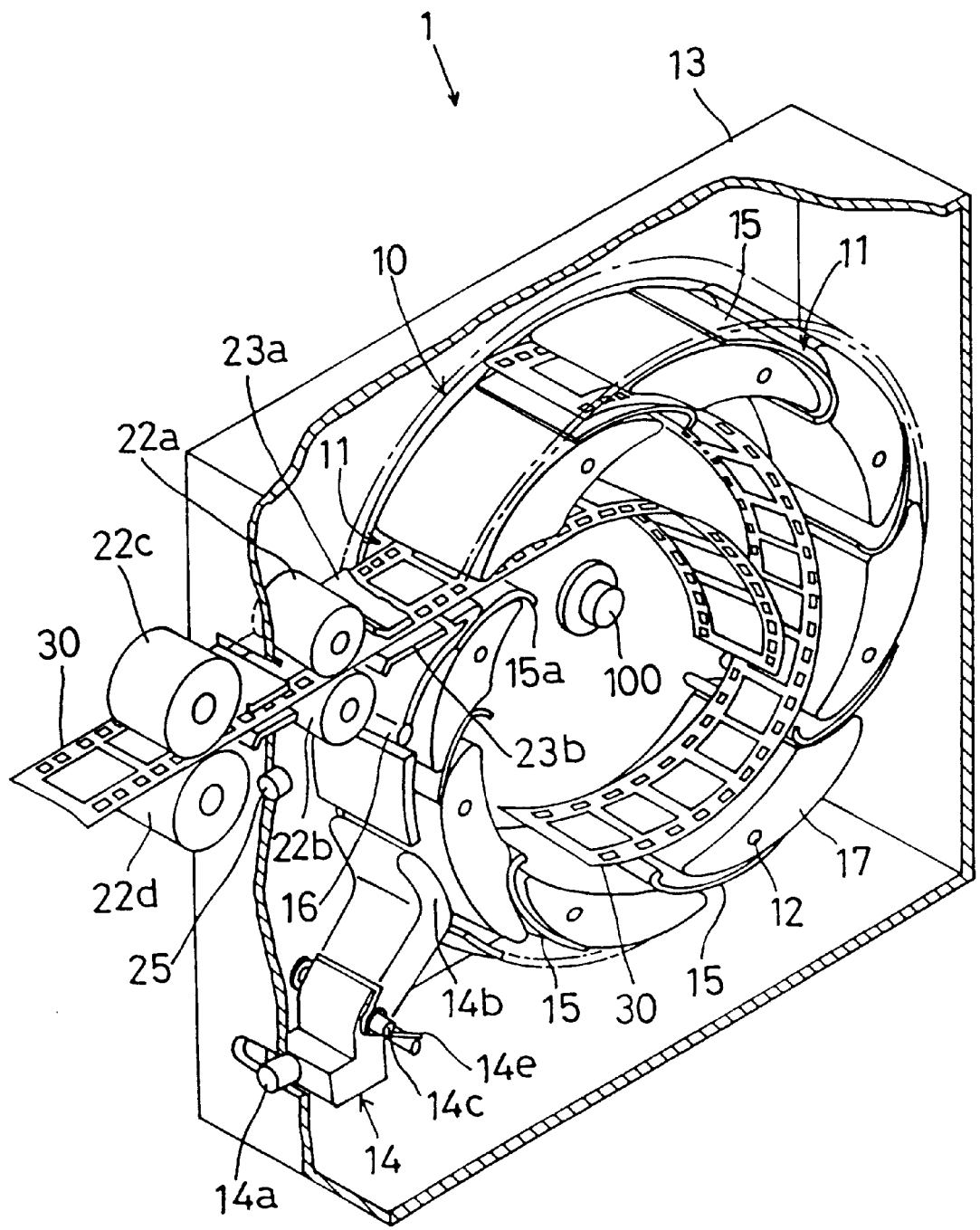
FIG. 3 is a perspective view showing a film magazine relating to one preferred embodiment of the present invention.
Figure 4:
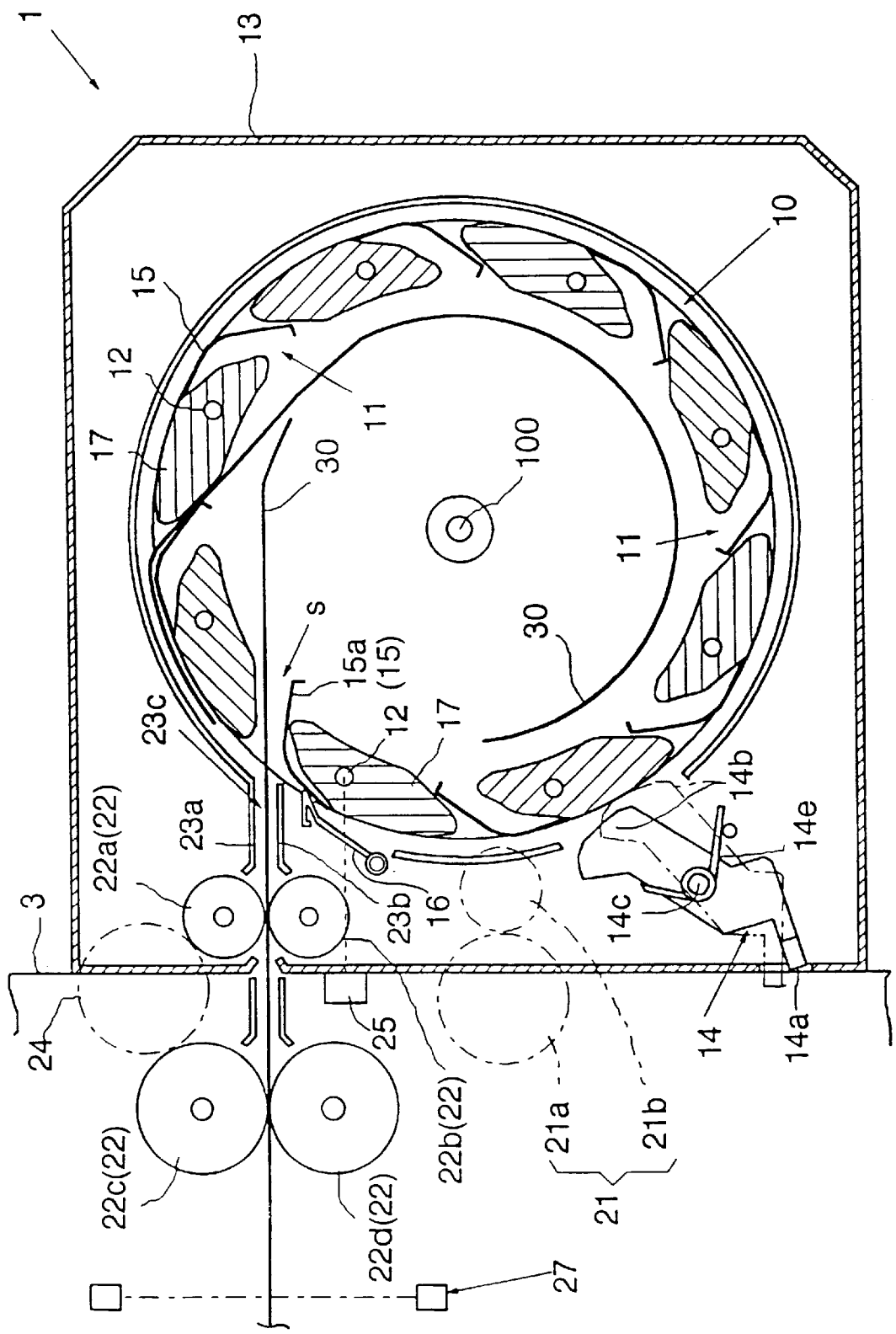
FIG. 4 is a plan view of the magazine shown in FIG. 3.

FIGS. 3 and 4 show the entire film magazine 1 to which the present invention relates. This film magazine 1 includes a case 13 principally constituting the overall outer appearance of the magazine, a rotary drum 10 rotatable about a rotation axis 100 disposed centrally of the drum, a drum driving means 21 for rotatably driving the drum 10, and a plurality of rollers 22 constituting the conveying device (alias, 'conveying means') for conveying the film 30 to the drum 10. The drum 10 equidistantly defines, in its outer periphery, a plurality of slits 11. Through each of these slits 11, the film 30 is inserted into the drum 10 to be stored therein or discharged from the inside of the drum 10. Adjacent each slit, there is provided a plate spring 15a as a retaining mechanism 15 for retaining an end of the film 30. Further, adjacent a certain plate spring, i.e. the plate spring 15a in this illustrated condition, located at an upper left position in FIG. 4, there is provided a retention releasing cam 16, as a retention releasing mechanism, which is placed under urged contact with the plate spring 15a. This retention releasing cam 16, by contacting the plate spring 15a, elastically deforms a free end of this plate spring 15a downwardly, thereby to form a gap(s) for allowing insertion of the film 30 therethrough. Incidentally, as may be apparent from FIG. 4, the retention releasing mechanism is disposed adjacent a pair of upper and lower guide plates 23a, 23b which are disposed on the left side in the same figure. Thus, only the plate spring 15 provided adjacent the slit 11 most adjacent the releasing cam 16 is released. Each plate spring 15a is normally under the retaining state for retaining the film 30. And, the plate spring 15a is elastically deformed to release the film only when the spring 15a comes into contact with the retention releasing mechanism 16. A roller denoted with numeral 24 functions as a drive transmitting means for transmitting a drive force to the rollers 22 disposed adjacent a film entrance of the magazine 1 when the magazine 1 is attached to the film printing apparatus 4.

In addition to the above-described components, the film magazine 1 further includes a rotation restricting arm denoted with numeral 14 and a position detecting means denoted with numeral 25 for detecting an angular position of the rotary drum 10.

The rotation restricting arm 14 is pivotally supported to the magazine case 13 via a pivot portion 14c provided at the center of the arm. Further, a right side end portion 14b in the same figure of the arm 11 is urged by such an urging member as a spring 14e, into loaded contact with the outer periphery of the drum 10, thereby applying a braking force to the outer periphery of the drum 10 against rotation thereof. When the right-side arm end portion 14b is placed under the loaded contact with the outer periphery of the drum 10, a left side end portion 14a of the arm projects to the outside of the case 13. Accordingly, when this film magazine 1 is attached to the winding device 3 of the printing apparatus 4, the winding device 3 come into abutment against a left side face of the magazine case 13 thus depressing the left end portion 14a of the rotation restricting arm 14.

Hence, the rotation restricting arm 14 is pivoted so as not to restrict rotation of the drum 10, in association with attachment of the film magazine 1 to the winding device 3.

The drum driving means 21 for rotatably driving the drum 10 includes a plurality of rollers 21a, 21b and the drive force thereof is supplied from the printing apparatus 4. More particularly, the roller 21b is constantly placed in contact with the outer periphery of the drum 10, so that the outer periphery of the drum 10 is rotated in unison with rotation of this roller 21a. Incidentally, on and above the outer periphery of the drum 10, the end of the film 30 is exposed. Then, the rollers 21a, 21b, which come into contact with this exposed end of the film, are formed of soft material such as rubber so as not to damage the end of the film. Alternatively, in order to avoid contact between the rollers 21a, 21b with the end of the film 30, these rollers may be constructed so as to contact only a bottom edge of the outer periphery of the drum 10.

The drum position detecting sensor (alias, 'drum sensor') 25 detects the angular position of the drum 10 relative to a gap 23c formed between the guide plates 23a, 23b. Namely, the condition in which the slit 11 of the drum 10 is aligned with the gap 23c is the position allowing insertion or discharge of the film 30. Then, the sensor 25 detects this condition and outputs its detection data to the control device 2 to be detailed later. More specifically, the drum sensor 25 detects whether or not the drum 10 is located at the position allowing insertion or discharge, by detecting, from the outside, a projecting portion of an unillustrated element inserted into a hole 12 provided for drum position detection.

Figure 5:
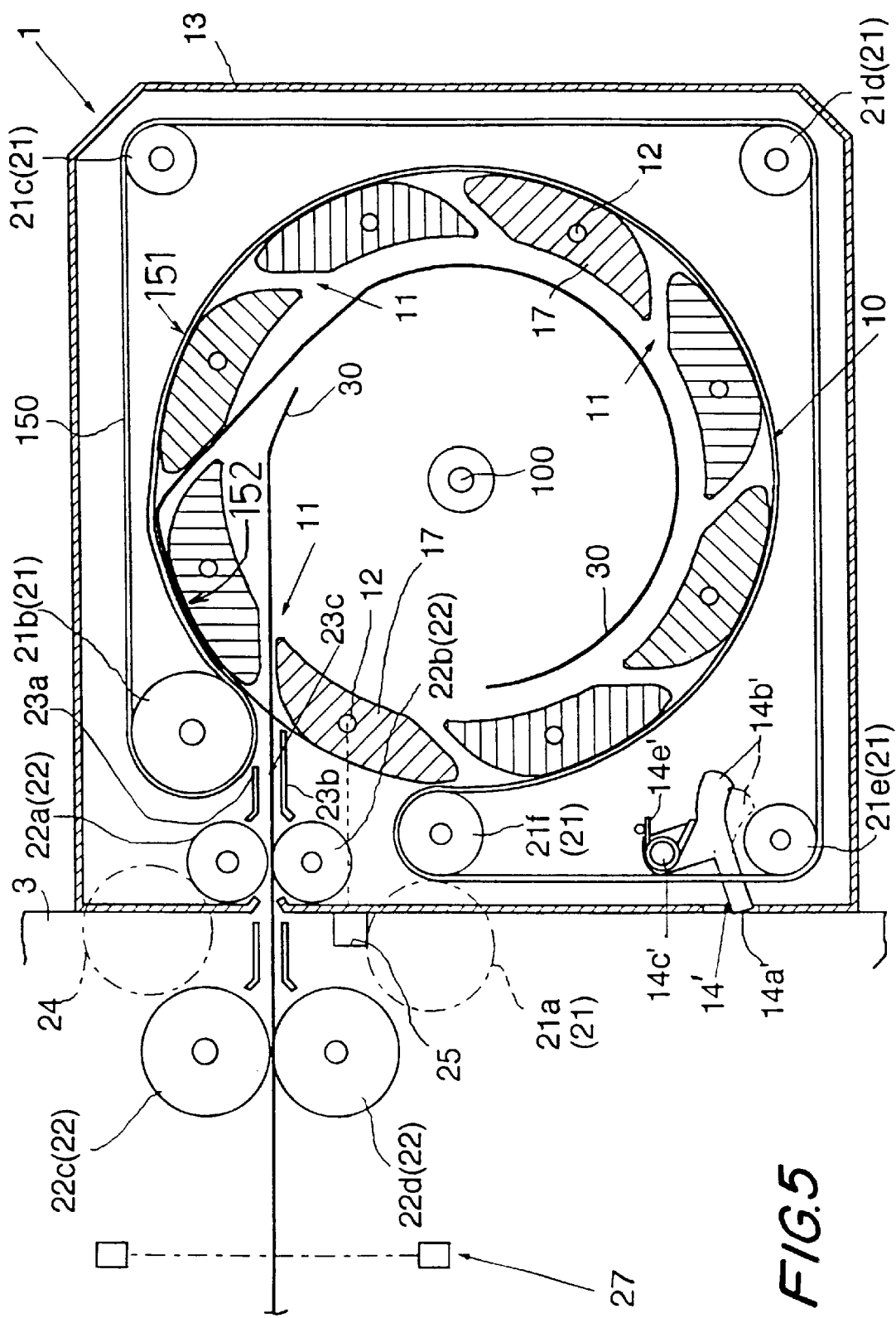
FIG. 5 is a plan view showing a film magazine having a modified retaining mechanism.

FIG. 5 shows a film magazine having a retaining mechanism different from that of the magazine shown in and described hereinbefore with reference to FIGS. 3 and 4. This retaining mechanism employs an endless belt denoted with numeral 150. This belt 150 is placed in contact with the outer periphery of the drum 10 over a substantial length of the belt, and the belt 150 functions to bind and retain the film 30 between an inner peripheral portion 151 thereof and the outer periphery 152 of the drum 10. This belt 150 is driven by means of a plurality of rollers 21a, 21b, 21d, 21e, 21f as the drum driving means 21, so as to rotatably drive, in turn, the drum 10. Further, the belt 150 has the dual-function, i.e. the function as the film retaining mechanism and the further function as the drum driving means. The roller 24 transmits the driving force from the printing apparatus to the roller 22a.

As described hereinbefore, the belt 150 does not contact the drum 10 over the entire periphery thereof, rather, the belt includes a non-contact region not contacting the drum adjacent an entrance for introducing the film 30 into the slit 11. In this manner, the non-contact region of the belt 150 not contacting the drum 10 is used as an entrance opening for allowing insertion into the drum 10 of the film 30 which is conveyed from the winding device 3 by means of the conveying device 22, and the retained condition of the film end is released at this non-contact region. Therefore, this alternative construction too allows discharge of the film 30 from the drum 10 as well as insertion of the film 30 into the drum 10.

The film magazine shown in FIG. 5 too includes a rotation restricting arm 14', which is similar to the arm 14 shown in FIG. 14. Unlike the restricting arm 14, however, this rotation restricting arm 14' does not restrict rotation of the drum 10 by being urged against the outer periphery of the drum 10. Rather, this arm 14 effects the restriction of drum rotation by means of a left end portion 14b' thereof which comes into contact with the roller 21e, i.e. the drum driving means, thereby to restrict rotation thereof. Incidentally, the left end portion 14b' of this arm 14' also projects from the left side face of the case 13, just like the end portion 14b of the arm 14. Then, when the magazine 1 is attached to the winding device 3, the arm 14' is pivoted counterclockwise in the figure, thereby to release the rotation restriction to the drum drive transmitting means 21.

Next, with reference to FIGS. 6 and 7, the process for feeding the film 30 from the winding device 3 into the film magazine 1 will be described. In the following description relating to the feeding order, the terms: 'leading end of the film' and 'trailing end of the film' are used for the sake of convenience. Here, it is understood that the leading end of the film refers to the portion of the film 30 which is first discharged from the winding device 3, i.e. the portion of the film 30 which is to be first introduced into the film magazine 1 and also that the trailing end of the film refers to the opposite end of the film which is to be last discharged from the winding device 3 into the magazine. Incidentally, in the subsequent description relating to the reverse feeding operation of the film 30 from the magazine 1 to the winding device 3, the terms: 'leading end' and 'trailing end' are also used, in spite of the difference in the feeding directions.

For conveying the film 30 stored within the winding device 3 to the film magazine 1, by activating the conveying device of the winding device 3 and the conveying device incorporated within the film magazine, the film 30 is inserted into the slit 11 of the drum 10.

Figure 6A:
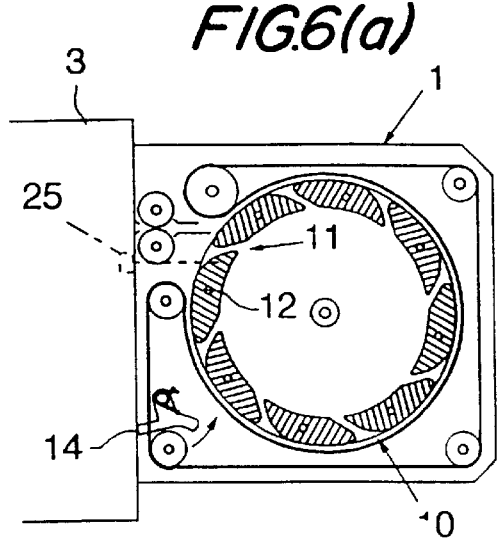
FIGS. 6 and 7 are views illustrating, in a step-by-step manner, a process for feeding films remaining in a winding device to the magazine of the invention.

First, the film magazine 1 is attached to the winding device 3 (the condition illustrated in FIG. 6a). With this attachment, the rotation restricting arm 14 of the film magazine 1 is pivoted to release the restriction of rotation of the drum 10. And, the drum sensor 25 detects whether the angular position of the drum 10 is presently located at the position allowing insertion of the film 30a or not. Then, based on this detection, if the drum 10 is not located at the predetermined position allowing film insertion, the drum 10 is driven to rotate via the drum drive transmitting means 21 clockwise in the same figure.

Figure 6B:
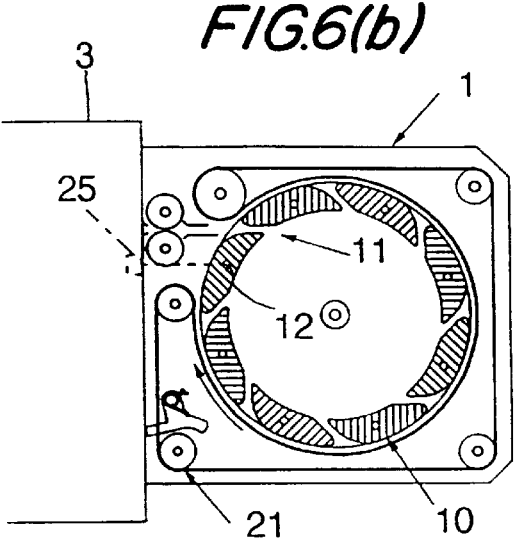
Figure 6C:
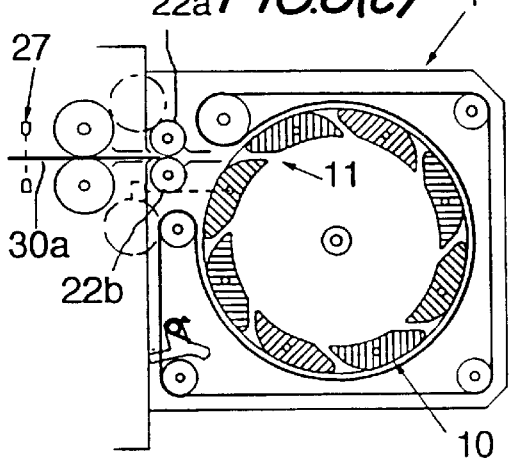

When the drum sensor 25 detects the position of the drum position detecting hole 12 defined in a segment 17 of the drum 10, the rotation of the drum 10 is stopped (the condition illustrated in FIG. 6b).

Figure 6D:
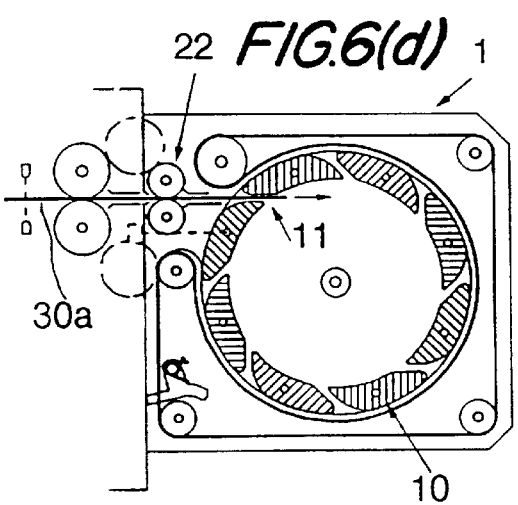
Figure 6E:
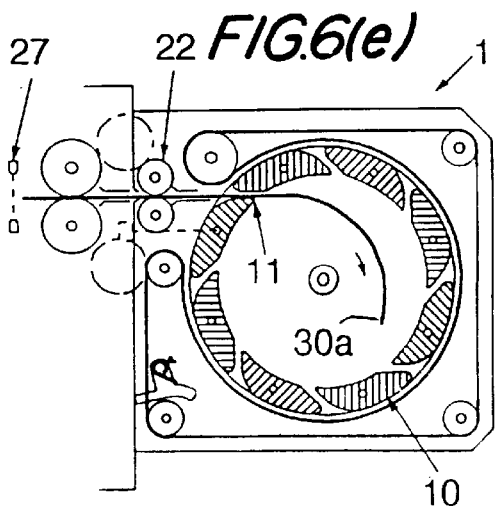

By activating the conveying device 22c, 22d of the winding device 3 and the conveying rollers 22a, 22b incorporated within the magazine, a conveying operation of the film 30a is started (the condition illustrated in FIG. 6c), and the leading end of the film 30a is introduced into the slit 11 (the condition illustrated in FIG. 6d).

From the above condition, the conveying operation of the film 30a is continued, until a film sensor 27 is rendered into a non-detecting condition and then a predetermined time period has lapsed. Namely, at the moment of detecting absence of the trailing end of the film, there still remains a significant distance between the trailing end of the film 30a and the slit 11 of the drum 10, thus it is still difficult for the retaining mechanism to retain the film 30. For this reason, the drum 10 keeps taking up the remaining length of the film therein, and when the length has become suitable for the retention by the film retaining mechanism, the activation of the conveying devices is stopped.

Figure 6F:
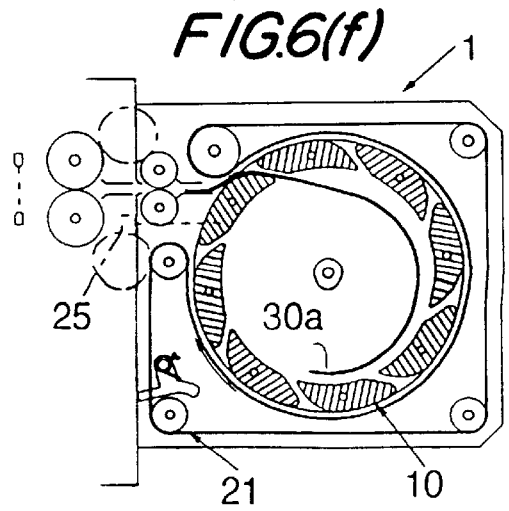

As illustrated in FIG. 6f, after the conveying devices are stopped, the drum 10 is rotated clockwise in the figure. And, this clockwise rotation of the drum 10 is stopped when the drum sensor 25 detects the predetermined position of the drum 10 allowing film insertion. This is the condition under which the film 30b can be inserted into the drum 10.

Figure 7G:
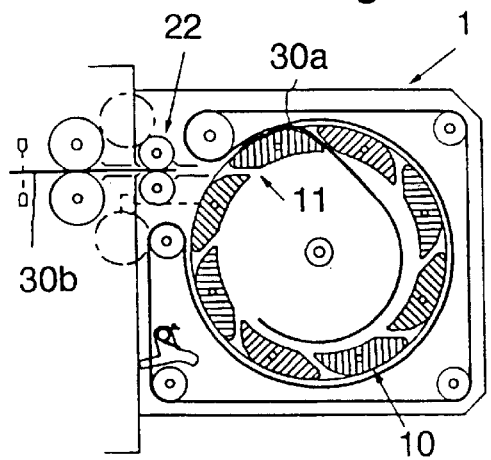
Figure 7H:
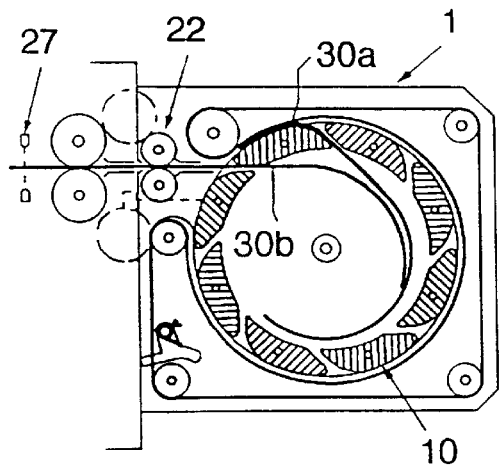
Figure 7I:
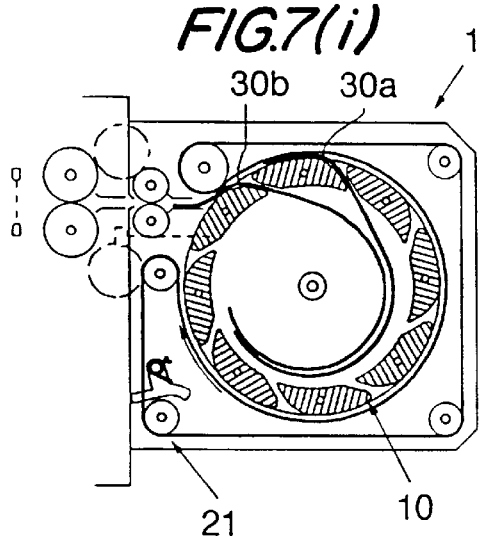

Thereafter, the conveying devices are activated again to convey the next film 30b (the condition illustrated in FIG. 7g). Then, as illustrated in FIG. 7h, the film 30b is conveyed into the drum and the trailing end of this film 30b is conveyed across the position of the film sensor 27 (the condition of FIG. 7h). Then, as described hereinbefore, after the lapse of the predetermined time period, the conveying devices are stopped. Thereafter, the drum 10 is again rotated clockwise. This rotation of the drum 10 is continued until the drum sensor 25 detects the predetermined position of the drum 10 allowing film insertion (the condition of FIG. 7i).

Figure 7J:
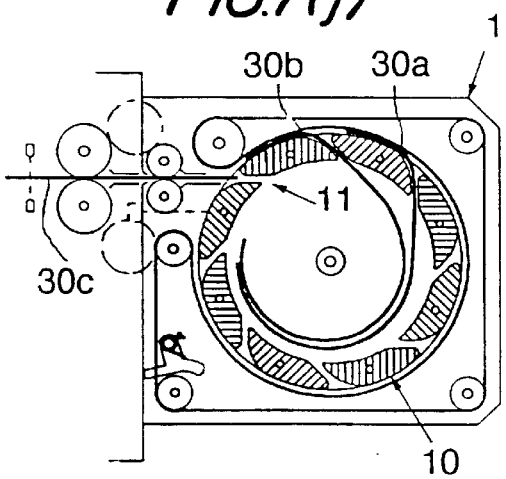
Figure 7K:
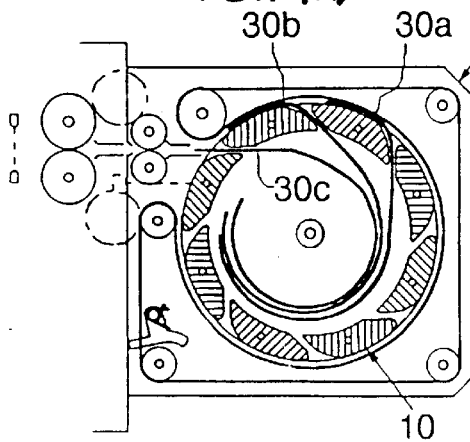
Figure 7L:
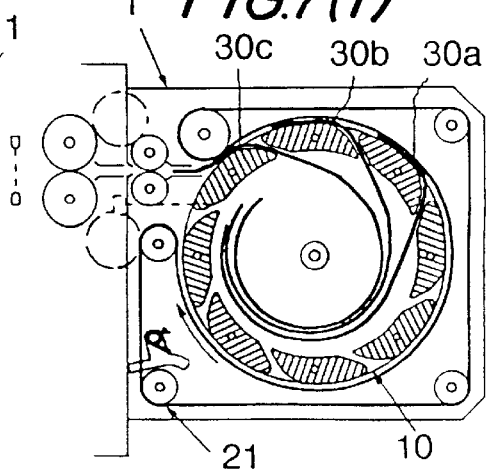

When the sensor 25 detects that the drum 10 has been rotated to the predetermined position, the drum 10 is stopped, and the magazine is ready for receiving the next film 30c. Thereafter, as illustrated in FIGS. 7j, 7k, 7l, the steps for inserting this next film 30c into the drum 10 are repeated in the same manners as described above.

Next, the reverse process for discharging the films 30 from the film magazine 1 will be described with reference to FIGS. 8 and 9.

Figure 8A:
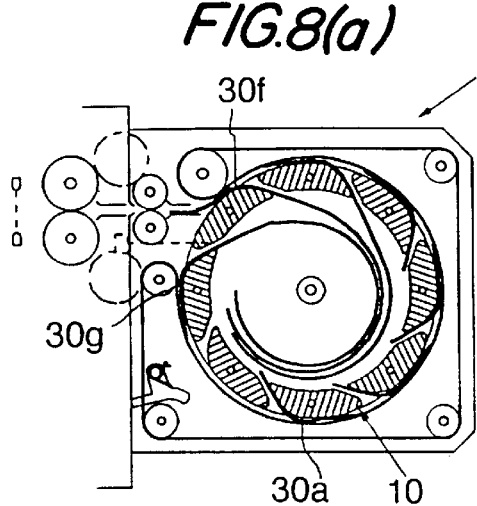
Figure 8B:
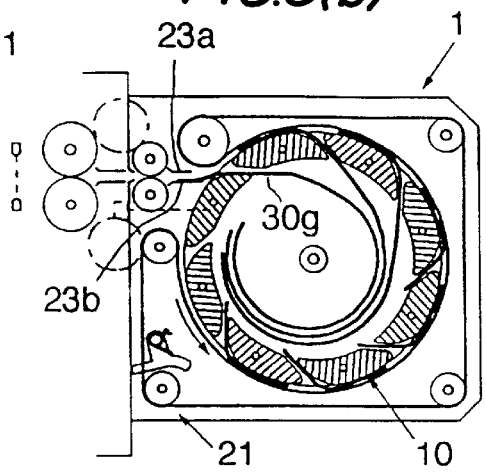

First, from the condition illustrated in FIG. 8a, the drum 10 is driven, via the drum drive transmitting means 21, to rotate counter-clockwise in the figures so as to be set to the predetermined position allowing film discharge. This rotation of the drum 10 is stopped when the drum sensor 25 detects the discharging, i.e. predetermined, position of the drum 10 (the condition illustrated in FIG. 8b). Then, the drum 10 is again rotated counter-clockwise so as to bring the trailing end of the film 30g past between the pair of guide plates 23a and 23b and to cause the film end to be retained between the rollers 22a, 22b of the conveying device (the condition illustrated in FIG. 8c). Incidentally, simultaneously with the counter-clockwise rotation of the drum 10, the pair of rollers 22a, 22b of the conveying device 22 are driven in the direction for discharging the film.

Figure 8C:
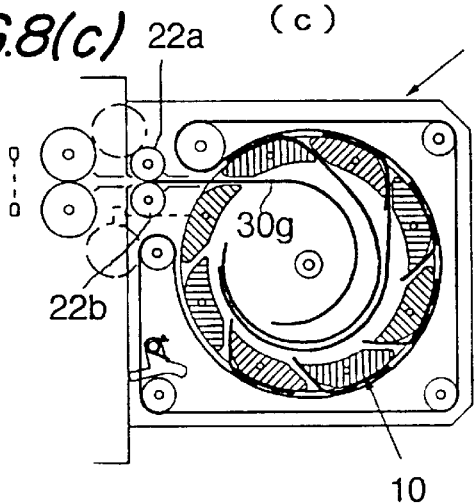
Figure 8D:
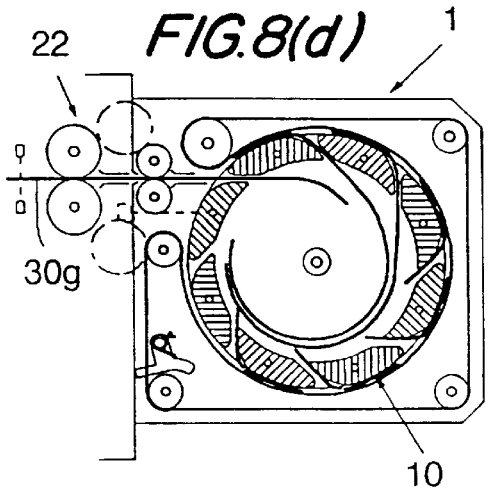
Figure 8E:
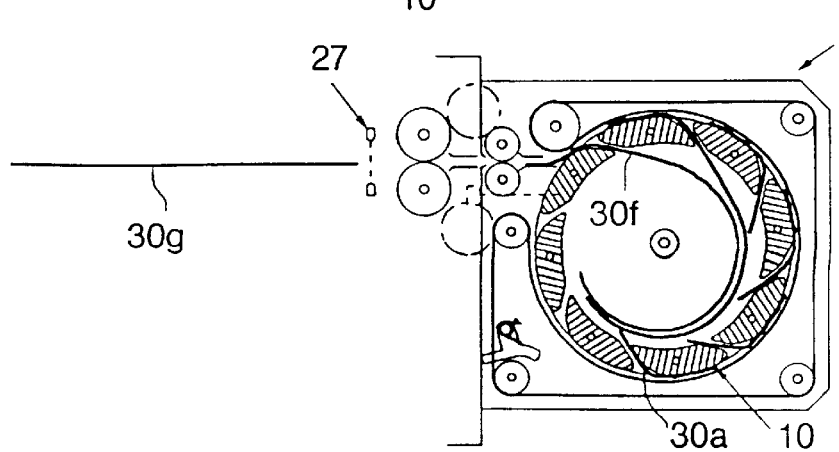

And, as illustrated from FIG. 8c to FIG. 8d, the trailing end of the film 30g is wound by the conveying device. Then, as illustrated in FIG. 8e, when the leading end of the film 30g passes the film sensor 27, like the case described hereinbefore, following the condition illustrated in FIG. 9f, when the drum 10 is rotated to the discharging position, the rotation of the drum 10 is stopped. And, the trailing end of the film 30f is taken up by the rollers 22a, 22b as the conveying device. Thereafter, following the conditions illustrated in FIGS. 9g, 9h, when the leading end of the film 30f passes the film sensor 27 as illustrated in FIG. 9i, the drum 10 is rotated to the position ready for discharging the next film 30e. Then, by repeating the above-described steps, in the reverse order of the take-up order of the films into the film magazine 1, the films 30e, 30d, 30c, 30b and 30a are discharged one after another from the magazine 1.

In the above-described case, the films are taken up into the magazine 1 in the order of the film 30a, film 30b, film 30c, film 30d, film 30e, film 30f, and the film 30g, and the films are discharged from the magazine 1 in the reverse order of the film 30g, film 30f, film 30e, film 30d, film 30c, film 30b and the film 30a. Next, with reference to FIG. 10, a different case will in described in which the films are discharged from the magazine 1 in the same order as their taken-up order into the magazine 1.

FIG. 10a illustrates a condition in which the last film 30g has been just taken up and stored in the film magazine 1.

As shown, under this condition, the trailing end of the last film 30g remains between the guide plates 23a, 23b. For this reason, in order to discharge the first film 30a, first, the drum 10 is rotated clockwise by an amount corresponding to two times the angular pitch of the slits. FIG. 10b illustrates a transitional condition in which from the condition of FIG. 10a the drum 10 has been rotated clockwise by an amount of one angular pitch of the slits 11. Under this condition of FIG. 10b, the trailing end of the film 30a to be discharged is not yet present between the guide plates 23a, 23b. Hence, if the conveying device 22 is driven under this condition, the target film 30a cannot be discharged. Therefore, the drum 10 is further rotated to the condition illustrated in FIG. 10c. However, under this condition too, the trailing end of the target film 30a is not yet retained between the pair of rollers 22a, 22b. Hence, the drum 10 is rotated counter-clockwise and the conveying device 22 is driven at the same time. Incidentally, this counter-clockwise angular displacement of the drum 10 corresponds to one pitch of the slits. With this, the trailing end of the film 30a is moved past between the guide plates 23a, 23b and then the film is conveyed by the rollers 22a, 22b. In this way, the target film 30a may be discharged from the magazine 1. When the leading end of the film 30a is moved past the film sensor 27, the system is ready for discharging the next film 30b. The discharging operation of the next film 30b is possible by effecting the same steps as described above. That is, from the condition upon completion of the discharging of the film 30a, the drum 10 is again rotated clockwise by the amount corresponding to twice the angular pitch of the slits 11, so as to cause the leading end of the film 30b retained between the pair of rollers 22a, 22b. Thereafter, the conveying device 22 is driven to discharge the film 30b out of the magazine 1 completely.

By repeating the above-described steps in series for the following films, i.e. the film 30c, film 30d, film 30e, film 30f and the film 30g, the films 30 may be discharged from the magazine 1 in the same order as they were taken up in the magazine 1.

Incidentally, as described hereinbefore, the term: 'angular pitch' of the slits 11 refers to the angular pitch between adjacent ones of the slits 11 which are formed equidistantly in the outer periphery of the drum 10.

Next, with reference to FIG. 11, a still further case will be described in which a desired, i.e. randomly selected, one of the films is discharged from the magazine.

This discharging operation of a selected film is possible by utilizing the same methods described above for sequentially discharging the films in the same order as or reverse order of charging them into the magazine. Suppose that e.g. the film 30d is to be selectively discharged from the magazine 1 charged with the films 30 into the plurality of slits 11 as illustrated in FIG. 11. For this purpose, as described hereinbefore, the system needs to be set to the predetermined condition allowing discharge of this film 30d. That is, to this end, it is necessary for the trailing end of the film 30d to be moved past between the guide plates 23a, 23b and then retained between the rollers 22a, 22b.

Figure 11A:
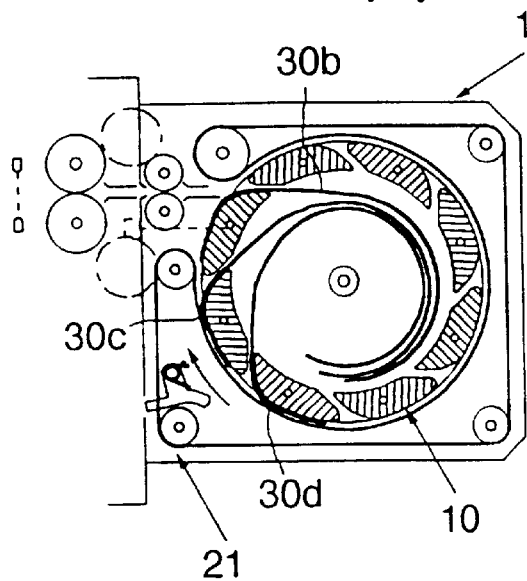
FIG. 11 is a view illustrating, in a step-by-step manner, a process for taking out a selected desired film from the plurality of films stored within the magazine.
Figure 11B:
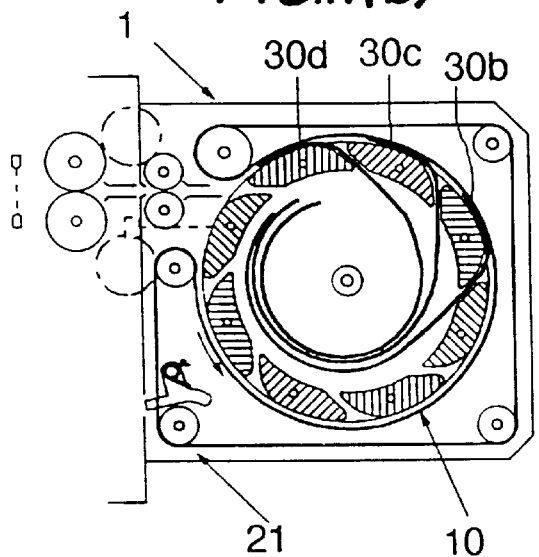
Figure 11C:
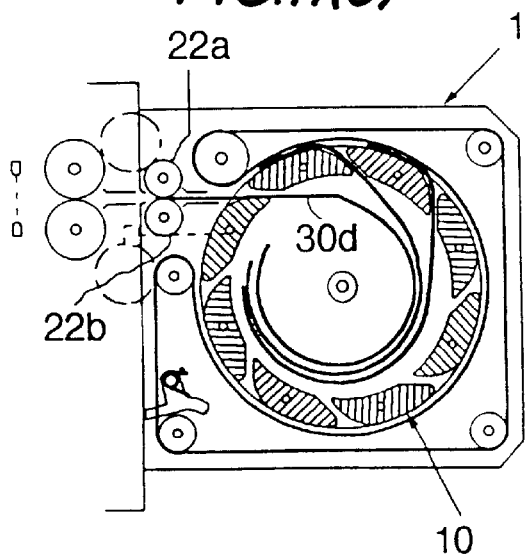
Figure 11D:
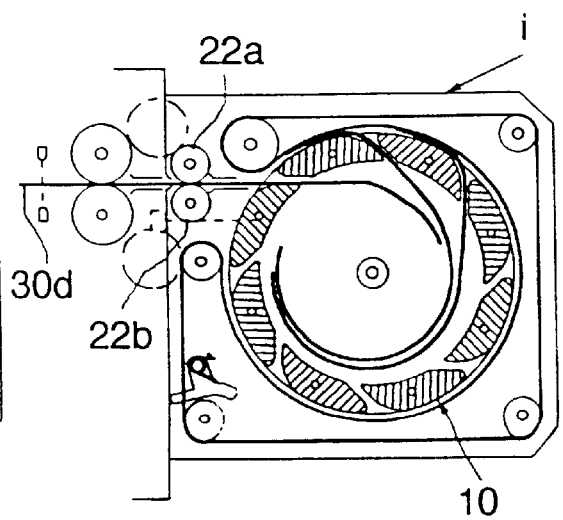

FIG. 11a shows the condition in which the magazine 1 is charged with the plurality of films 30. Then, in order to discharge the target film 30d from this condition, the drum 10 is rotated clockwise by three times the angular pitch of the slits 11. This condition is illustrated in FIG. 11b. In this condition, the trailing end of the film 30d is not yet retained between the rollers 22a, 22b. Thus, the drum 10 is then rotated counter-clockwise by one angular pitch of the slits 11. This condition is illustrated in FIG. 11c. In this condition, the trailing end of the film 30d is retained between the rollers 22a, 22b, so that the conveying devices are driven to discharge the film 30d as illustrated in FIG. 11d.

By effecting the above-described steps, any desired one of the films may be discharged from the drum 10.

FIG. 12 is a block diagram of a control device for controlling the rotation of the drum 10 and the activation and deactivation of the conveying device 22.

The detection in the magazine 1 is effected by means of the drum sensor 25 which detects whether the drum 10 is located at the predetermined, charging/discharging position or not. Further, the winding device 3 incorporates a film sensor 27 which detects whether the trailing or leading end of the film 30 has been moved past the conveying device 22 or not. And, the detection data from these sensors, i.e. the drum sensor 25 and the film sensor 27, are all inputted to the control device 2. This control device 2 includes a conveyer drive instructing means 29 for generating a signal for activating the conveying device 22 in response to the input signals from the sensors 25, 27 and a drum drive instructing means 28 for generating a signal for driving the drum driving means 20.

A further embodiment of the present invention will be described next.

In the case of the construction of the retaining mechanism shown in FIGS. 3 and 4, the plate springs 15 are employed as this mechanism and the releasing cam 16 is provided as the retention releasing means for releasing the retention by the plate springs. However, considering the stiffness of the film in the charging/discharging direction thereof, the releasing cam 16 as the retention releasing means may be eliminated. Specifically, by appropriately adjusting the urging force of the plate spring 15, when the leading end of the film 30 is fed from the winding device into the slit 11 of the drum 10, this leading end of the film may be inserted, against the urging force of the spring, between the plate spring 15 and upper wall of the slit (i.e. the side face of the segment 17 of the drum 10) against which the plate spring contacts, In the foregoing embodiment, the control device 2 executes control of the driving of the drum 10 and the activation/deactivation of the conveying device. Instead, the timings of driving of the drum 10 and of activation and deactivation of the conveyer device may be controlled manually. Further, in the foregoing embodiment, the drum 10 obtains its drive force from the printing apparatus. Instead, the drum 10 may be driven manually.

Further, the detection of the film charging position of the slit 11 can be detected as long as the relative position between the projecting portion of the unillustrated element inserted into the hole 12 defined in the segment 17 of the drum 10 and the slit 11 is maintained constant. Hence, the slits 11 may be formed in the outer periphery of the drum 10 with unequal inter-distances therebetween. Further, in the foregoing embodiment, the total of eight slits 11 are formed in the drum 10. However, the number of slits may vary as desired, by adjusting the diameter of the drum 10.

Also, the drum 10 of the above-described film magazine 1 has a hollow construction. Thus, not only the film pieces having 2 to 6 frames, a longer film roll having e.g. 24 frames may be retained to the drum by increasing the entire capacity of the drum 10.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film magazine for storing a plurality of films therein, which comprises:
   a drum capable of storing the plurality of films;
   a plurality of retaining mechanisms for retaining respective ends of the films relative to the drum;
   said drum defining a plurality of slits for allowing individual insertion of the ends of the films into the drum; and film discharging mechanism which discharges the plurality of films in alterable order by rotating the drum so as to be set to a position which allows one of the plurality of films retained by the retaining mechanism to be discharged and by releasing the retaining mechanism of the film to be discharged.

2. A film magazine as defined in claim 1, wherein the retaining mechanisms are respectively disposed adjacent the slits.

3. A film magazine as defined in claim 1, wherein the retaining mechanism comprises a plate spring having one end fixedly attached to the drum and the other free end movable between a retaining position and a releasing position.

4. A film magazine as defined in claim 3, wherein the free end of the plate spring is urged in the direction toward the retaining position.

5. A film magazine as defined in claim 3, further comprising a retention releasing mechanism for switching over the plate spring from the retaining position to the releasing position.

6. A film magazine as defined in claim 5, wherein said retention releasing mechanism comprises a retention releasing cam capable of operating the plate spring into the releasing position by elastically deforming the free end of the plate spring.

7. A film magazine as defined in claim 1, wherein the plurality of retaining mechanisms comprises a belt disposed in contact with and about an outer periphery of the drum for retaining the ends of the films between the belt and the drum outer periphery.

8. A film magazine as defined in claim 7, wherein the outer periphery of the drum includes a contact area contacting the belt and a non-contact area free from contact with the belt.

9. A film magazine as defined in claim 1, further comprising a drum-rotation restricting member for restricting rotation of the drum by coming into contact with the outer periphery of the drum.

10. A film magazine as defined in claim 9, wherein the drum-rotation restricting member is rendered inoperative for not restricting the drum rotation when the film magazine is attached to a printing apparatus.

11. A film magazine as defined in claim 2, further comprising conveying means for conveying the film to the drum; and drive transmitting means for transmitting a drive force from a printing apparatus to the conveying means.

12. A film magazine as defined in claim 11, wherein the conveying means comprises a roller disposed adjacent an entrance opening through which the film is inserted into the film magazine, said roller receiving the drive force from the printing apparatus in association with attachment of the film magazine to the printing apparatus.

13. A film magazine as defined in claim 12, further comprising detecting means for detecting an angular position of the drum; and drum driving means for driving the drum by a predetermined angle based on detection information of the detecting means.

14. A film magazine as defined in claim 13, wherein said drum driving means receives the drive force from the printing apparatus in association attachment of the film magazine to the printing apparatus.

15. A film magazine as defined in claim 12, wherein the predetermined angle corresponds to an angular pitch of the plurality of slits defined in the outer periphery of the drum.

16. A film magazine for storing a plurality of films therein, which comprises:

a drum capable of storing the plurality of films;

a plurality of retaining mechanisms for retaining respective ends of the films relative to the drum, said drum defining a plurality of slits for allowing individual insertion of the ends of the films into the drum, wherein the retaining mechanisms are respectively disposed adjacent the slits;

conveying means for conveying the film to the drum, said conveying means comprising a roller disposed adjacent an entrance opening through which the film is inserted into the film magazine, said roller receiving the drive force from a printing apparatus in association with attachment of the film magazine to a printing apparatus;

drive transmitting means for transmitting a drive force from the printing apparatus to said conveying means;

detecting means for detecting an angular position of said drum, and drum driving means for driving said drum by a predetermined angle based on detection information of said detecting means.

17. The film magazine of claim 16, wherein said drum driving means receives the drive force from the printing apparatus in association with attachment of the film magazine to the printing apparatus.

18. A film magazine for storing a plurality of films therein, which comprises:

a drum capable of storing the plurality of films;

a plurality of retaining mechanisms for retaining respective ends of the films relative to the drum, said drum defining a plurality of slits for allowing individual insertion of the ends of the films into the drum, wherein the retaining mechanisms are respectively disposed adjacent the slits;

conveying means for conveying the film to the drum, said conveying means comprising a roller disposed adjacent an entrance opening through which the film is inserted into the film magazine, said roller receiving the drive force from a printing apparatus in association with attachment of the film magazine to a printing apparatus;

drive transmitting means for transmitting a drive force from the printing apparatus to said conveying means; wherein the predetermined angle corresponds to an angular pitch of the plurality of slits defined in the outer periphery of the drum.

* * * * *